Patented Oct. 19, 1943

2,331,979

UNITED STATES PATENT OFFICE 2,331,979

SOFTENER FOR EMULSION COPOLYMERS OF BUTADIENE AND ACRYLONITRILE

Donald E. Henderson, Akron, Ohio, assignor to The B. F. Goodrich Company, New York, N. Y., a corporation of New York No Drawing. Application March 25, 1941, Serial No. 385,149

2 Claims. (Cl. 260—28)

This invention relates to softeners for copolymers of butadiene and acrylonitrile and to improved compositions obtainable by the use of such softeners.

The softening of synthetic rubber has in general presented problems not encountered in the softening of natural rubber, due to differences in behavior on mill rolls, incompatibility of synthetic rubber with certain softening materials commonly employed in natural rubber, and other differences in properties. It has been particularly difficult to find satisfactory softeners for the processing of the oil-resisting synthetic rubbers prepared by the emulsion copolymerization of butadiene and acrylonitrile. The problem has been further complicated by the fact that some softeners for synthetic rubbers prepared by copolymerizing butadiene and acrylonitrile in one ratio are not satisfactory materials for use with copolymers of a different composition. Thus the 55:45 emulsion copolymer of butadiene and acrylonitrile, by which I mean a synthetic rubber prepared by copolymerizing 55 parts of butadiene and 45 parts of acrylonitrile in an aqueous emulsion, is not satisfactorily softened by some of the most useful softeners for copolymers prepared from 75 parts of butadiene and 25 parts of acrylonitrile.

I have now discovered that coal tar is an excellent softener for synthetic rubber prepared by the copolymerization in aqueous emulsions of about 45 parts of acrylonitrile and 55 parts of butadiene. Coal tar is not only compatible with such a copolymer in a wide range of proportions, but it is readily incorporated into the synthetic rubber on a roll mill. Furthermore, uncured 55:45 emulsion copolymer compositions containing coal tar are easily tackified which reduces processing and building difficulties, and vulcanizates containing coal tar exhibit excellent tensile strengths and ultimate elongations.

The term "coal tar" is used herein in its ordinary sense to designate the thick viscous liquids or tars obtained by the distillation of coal, such as the crude distillates from coke ovens. The crude distillate known generally as crude soft coal tar is an excellent softener as well as a very cheap material and is preferred for use in this invention but other crude viscous liquids obtained by the distillation of coal may also be used.

The coal tar may be incorporated in the 55:45 emulsion copolymer by any desired means such as on a roll mill or in an internal mixer of the Banbury type. It may also be desirable to incorporate the softener in a solution or dispersion of the 55:45 emulsion copolymer.

Coal tar is compatible with the 55:45 emulsion copolymer of butadiene and acrylonitrile in a wide range of proportions, and may accordingly be employed in any of the amounts in which it is customary to use softeners. 100 parts of coal tar may be readily incorporated in 100 parts of synthetic rubber on a roll mill, for instance, although not more than about 50 parts are ordinarily employed in commercial operations.

As a specific example, 100 parts of a synthetic rubber prepared by copolymerizing in an aqueous emulsion 55 parts of butadiene and 45 parts of acrylonitrile were broken down on a roll mill at 120–130° F. Crude soft coal tar was then added as fast as it was absorbed by the copolymer. After only about five minutes, 50 parts of the tar were incorporated in the copolymer. The conventional pigments, sulfur, and an accelerator were then added. The composition had some tack, but when brushed with an organic solvent such as acetone, ethyl acetate, methyl ethyl ketone, chloroform, chlorotoluene, isopropyl chloride, for instance, the composition developed excellent tack. The development of tack when a solvent is brushed on the composition appears to be a function of the mixture rather than of the butadiene-acrylonitrile copolymer alone, for synthetic rubber compositions containing many softeners do not develop a satisfactory tack when brushed with a solvent. 55:45 emulsion copolymers containing from 20–50 or more parts of coal tar based on 100 parts of rubber, however, exhibit greatly improved tack when brushed with a solvent.

When the above compounded composition was cured, a vulcanizate having excellent tensile strength and elongation was produced. The characteristics of the vulcanizate also appear to depend somewhat upon the type of softener used, for compositions containing the same synthetic rubber but a different softener are often considerably weaker and stiffer than the vulcanizates of this invention.

This invention is limited to the use of coal tar with copolymers of butadiene and acrylonitrile in a ratio of about 55:45. Although slight variations in proportions, such as the use of as much as 60 or as little as 50 parts of butadiene, are within the scope of the invention, the best results are obtained when the copolymer described in the specific example is employed. The proportions throughout the specification and claims are by weight.

Other materials such as natural rubber, other softeners, pigments, fillers, vulcanizing agents, accelerators, antioxidants, and the like may be included in the compositions herein described.

Although the nature of the copolymers should not be greatly changed many other modifications such as varying the method of adding the softener and the use of different coal tar fractions are within the spirit and scope of the invention as defined in the appended claims.

I claim:

1. A synthetic rubber composition capable of developing tack when brushed with an organic solvent, said composition comprising a rubbery copolymer prepared by copolymerizing in aqueous emulsion about 55 parts of butadiene-1,3 and about 45 parts of acrylonitrile, and from 20 to 50 parts, based on 100 parts of the copolymer, of coal tar.

2. A synthetic rubber composition capable of developing tack when brushed with an organic solvent, said composition comprising a 55:45 emulsion copolymer of butadiene-1,3 and acrylonitrile, and from 20 to 50 parts, based on 100 parts of the copolymer, of soft coal tar.

DONALD E. HENDERSON.